United States Patent [19]

Vittone et al.

[11] Patent Number: 4,612,229
[45] Date of Patent: Sep. 16, 1986

[54] PROCESS FOR PREPARING FIBRILLATED FILMS OR NETLIKE STRUCTURES OF SYNTHETIC POLYMERS

[75] Inventors: Andrea Vittone, Milan; Pierpaolo Camprincoli, Terni; Adriano Grandona, Milan, all of Italy

[73] Assignees: Montedison S.p.A.; Moplefan S.p.A., both of Milan, Italy

[21] Appl. No.: 634,386

[22] Filed: Jul. 25, 1984

Related U.S. Application Data

[60] Continuation of Ser. No. 526,806, Aug. 26, 1983, abandoned, which is a division of Ser. No. 435,277, Oct. 19, 1982, abandoned, which is a continuation of Ser. No. 150,709, May 19, 1980, abandoned.

[30] Foreign Application Priority Data

May 18, 1979 [IT] Italy ................ 22,801 A/79

[51] Int. Cl.⁴ .............. B29C 67/22; B29C 55/06
[52] U.S. Cl. .................... 428/155; 264/54; 264/147; 264/162; 264/257; 264/DIG. 7; 264/DIG. 8; 264/DIG. 47; 428/131
[58] Field of Search .......... 264/DIG. 8, 257, 162, 264/DIG. 47, 54, DIG. 7, 147; 156/42, 39, 43

[56] References Cited

U.S. PATENT DOCUMENTS

| | | | |
|---|---|---|---|
| 2,268,965 | 1/1942 | Schumann | 264/257 X |
| 3,403,203 | 9/1968 | Schirmer | 264/DIG. 8 |
| 3,470,595 | 10/1969 | Goppel | 264/DIG. 47 |
| 3,490,663 | 1/1970 | Skinner | 264/DIG. 47 |
| 3,539,666 | 11/1970 | Schirmer | 264/DIG. 8 |
| 3,549,470 | 12/1970 | Greenwald et al. | 264/DIG. 8 |
| 3,634,564 | 1/1972 | Okamoto et al. | 264/DIG. 8 |
| 4,242,407 | 12/1980 | Bijen | 264/257 X |
| 4,267,136 | 5/1981 | Bijen | 264/257 X |
| 4,297,409 | 10/1981 | Hannaht | 264/257 X |
| 4,344,804 | 8/1982 | Bijen et al. | 264/257 X |

FOREIGN PATENT DOCUMENTS

| | | | |
|---|---|---|---|
| 1073741 | 6/1967 | United Kingdom | |
| 1192132 | 5/1970 | United Kingdom | 264/DIG. 8 |

*Primary Examiner*—Philip Anderson

[57] ABSTRACT

Fibrillated films or flat netlike structures made of synthetic polymers and having a specific surface area of more than 12 m²/g. the thickness thereof in microns are disclosed, as is use of said films or flat netlike structures as reinforcement for hydrosetting binders such as cement. A method of preparing the fibrillated films or flat netlike structures is also disclosed.

5 Claims, 2 Drawing Figures

PROCESS FOR PREPARING FIBRILLATED FILMS OR NETLIKE STRUCTURES OF SYNTHETIC POLYMERS

This is a continuation of application Ser. No. 526,806, filed Aug. 26, 1983, now abandoned, which in turn is a division of Ser. No. 435,277 filed Oct. 19, 1982 and now abandoned which in turn is a continuation of Ser. No. 150,709 filed May 19, 1980 and now abandoned.

BACKGROUND OF THE INVENTION

British Pat. No. 1,073,741, describes a method for preparing flat or tubular net-shaped or netlike structures consisting of interconnected, longitudinally oriented, synthetic polymer filaments, by producing, with the help of suitable cutting devices, a series of parallel and distanced fissures or slots in a flat or tubular, mono-oriented polymeric film, so that the successive transversal expansion of the film would create such a netlike structure.

Netlike structures of a similar type, though formed by filaments interconnected with each other in a more irregular and casual way, may be achieved, moreover, by disgregation (breaking up) or slitting mono-oriented polymeric films by different method, such as, for instance, by sandblasting, brushing or rubbing.

The products thus obtained, in general, are bulky and flexible and display a specific surface area of up to 10 to 12 m$^2$/g. the thickness thereof in microns. They are used in the manufacture of ropes, strings and textile materials of various kinds.

Spanish Pat. No. 460,292 disclosed use of structures of this type, opened by cross-expansion, in inoragnic hydrosetting binder-based mixes, in order to improve their mechanical characteristics.

Given the chemical incompatibility of synthetic polymers in general toward the inorganic materials that form the hydrosetting binders, the polymeric structures thus used, hardly adhere to the matrix of the binder and, therefore, the reinforcing effect is not altogether effective.

THE PRESENT INVENTION

One of the objects of this invention is to provide fibrillated films or flat netlike structures made of synthetic polymers that display a specific surface area of more than 12 m$^2$/g. the thickness thereof in microns.

Another object is to provide a process for the preparation of the above-mentioned films or structures.

Still another object is to provide cement mixes or other similar hydrosetting inorganic binders having such fibrillated films or flat netlike structures incorporated therein.

The fibrillated films or flat netlike structures of this invention, display a specific surface area of more than 12 m$^2$/g. the thickness thereof in microns, but preferably comprised between more than 12 m$^2$/g. the thickness thereof in microns, e.g., 15 m$^2$/g. the thickness in microns, and 100 m$^2$/g. the thickness in microns. They may consist of any kind of orientable synthetic polymers, among which, as exemplary, may be listed: polyolefins, polyamides, vinyl polymers, polyesther resins and any mixtures thereof.

Figure 1:
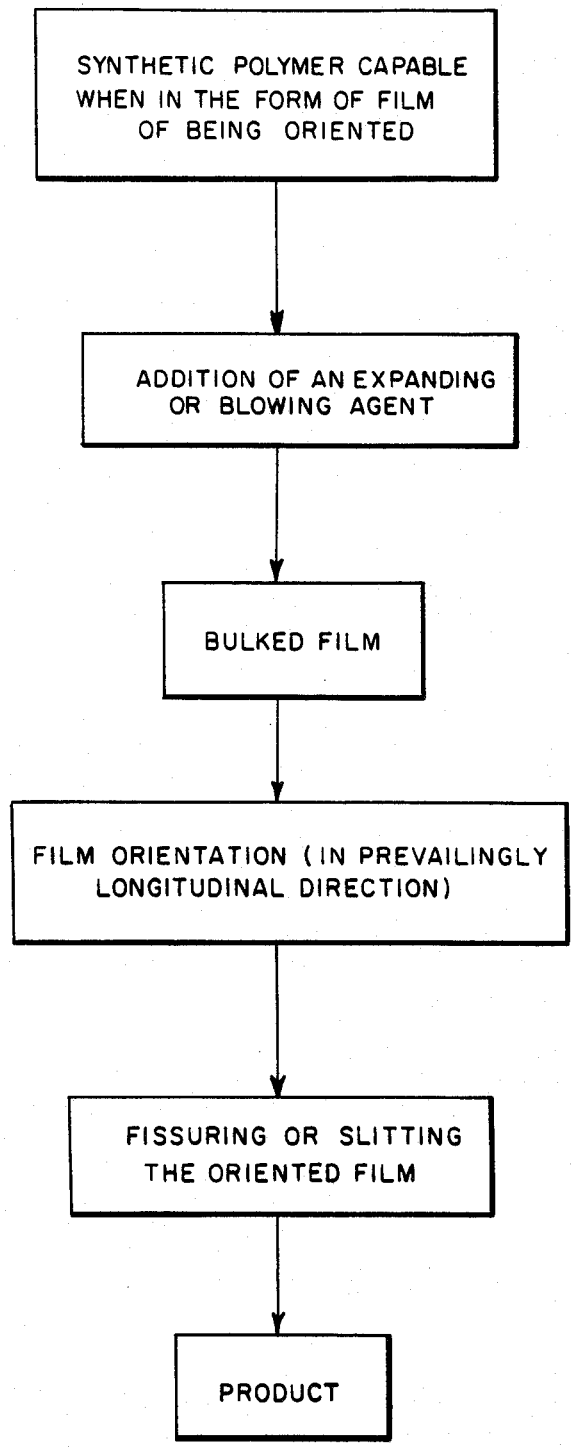
FIG. 1 is a flow diagram of the embodiment of the process using a blowing.
Figure 2:
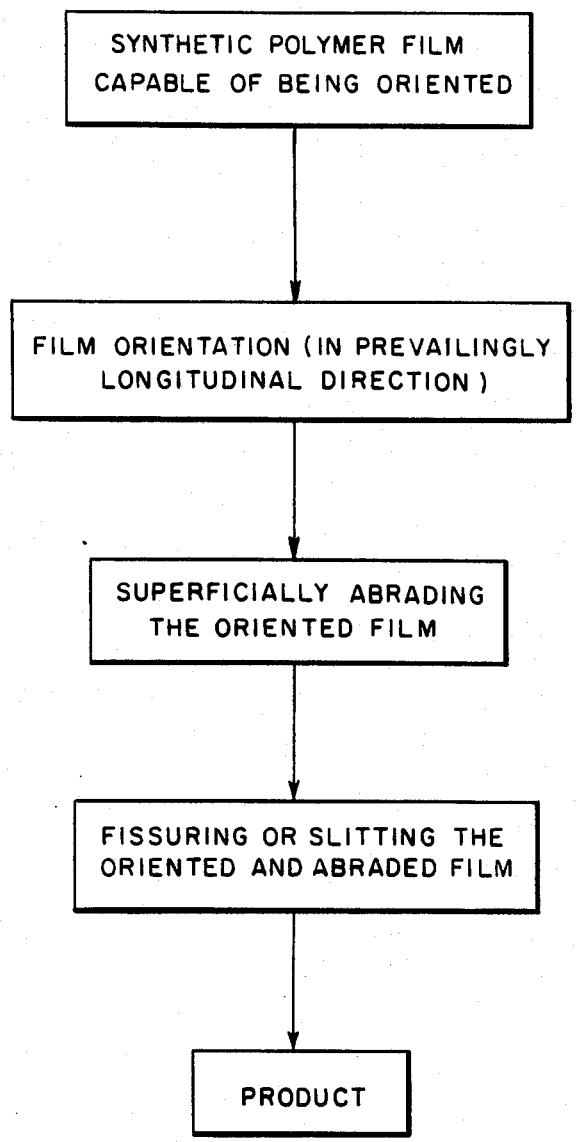
FIG. 2 is a flow diagram of the embodiment of the process in the absence of a blowing agent.

A preferred method according to this invention for obtaining such films or structures, consists of the following operations or stages:
 (a) preparation of an orientable synthetic polymeric film containing an expanding or blowing agent;
 (b) expansion of the expanding or blowing agent with the formation of a bulked film;
 (c) orienting of the film in a longitudinal or prevailingly longitudinal direction, by stretching, with longitudinal stretch ratios comprised between 3 and 15 with the formation of an oriented film showing a thickness comprised between 20 and 200$\mu$;
 (d) fissuring or slitting of the oriented film.

The preparation of the starting film is carried out according to known procedures, starting from mixes of at least one synthetic polymer as exemplified above with an expanding or bulking agent, for instance, by extrusion or casting. Examples of usable bulking agents are, for instance: azodicarbonamide, azoisobutyrronitrile, dinitrosopentamethylenetetramine, sodium bicarbonate.

The expansion operation (b) is carried out by conventional techniques, depending on the type of expanding agent used. The quantity, granulometry, the type of expanding agent as well as the expansion conditions, should at any rate be chosen in such a way that the bubbles that form inside the film shall have a mean diameter not exceeding 50%, but preferably not exceeding 20% of the thickness of the film.

The expansion of the film may also be obtained by allowing liquids having boiling temperatures below the temperature of the molten polymer, to expand in the molten polymer in the presence of nucleating agents acting as expansion starters and regulators. Techniques of this kind are described for instance, in Italian Pat. No. 841,148, which correspond to British Pat. No. 1,227,454.

When the film is prepared by extrusion, at a temperature corresponding to or greater than the temperature at which the expanding agent becomes active, or if it is prepared according to procedures requiring the attainment of such a temperature, the expansion operation may be carried out contemporaneously with the film-preparation operation, provided that the operating conditions are strictly controlled, such as to give place to the formation of microsized bubbles uniformly distributed throughout the film, without compromising the integrity of the film and, on the contrart, allowing its monoaxial stretching without ruptures.

The orientation operation (c) is carried out according to conventional methods, by a longitudinal hot-stretching between sets of fast and slow revolving rollers.

The fibrillation of the oriented film is finally obtained by the slitting operation (d) which, preferably, is carried out by passing the film over surfaces fitted with fissuring or slitting means such as, for instance, blades, pins or needles, pointed or sharp projections.

A method and a device particularly suited for such an operation are those described in British Patent No. 1,073,741, according to which nailed rollers are used.

A second method for preparing fibrillated films according to the invention, and which may be used either alone or in combination with the one described above, consists of the following operations:
 (a') longitudinal orientation, by stretching of a film of at least one orientable synthetic polymer, using stretch ratios comprised between 3 and 15, thereby obtaining an oriented film with from 20 tp 200μ thickness;

(b') superficial abrasion of the stretching film;

(c') fissuring or slitting of the oriented and abraded film.

The abrasion operation (b') may be achieved by rubbing the film between emery cloths, abrasive papers or grinding wheels, or also be sandblasting, rubbing between brushes, or by other such methods.

The abrasion shall not, however, lead to the proper fissuring or slitting of the film.

The orienting and slitting operations on the film may be conducted according to what has been stated hereinabove with reference to the corresponding operations (c) and (d).

Once they have been obtained, the fibrillated or netlike structured films of this invention may be made wettable by means of oxidative superficial treatments such as the known flame treatments or by high frequency electric discharges.

The fibrillated or netlike structured films of this invention, may present themselves in the form of single elements of in the form of packs of several superimposed fibrilled films in various arrangements, in which the single films are either free with respect to each other or are welded together.

The following enabling examples are given to illustrate the invention in more detail and are not intended to be limiting.

EXAMPLE 1 (COMPARATIVE)

A polypropylene film having a melt index of 16 and additioned with 9% of low density polyethylene, wad extruded on a flat-headed extruder into a water filled tank.

The extrusion temperatures were around 185° C. at the worm-screw, and around 165° C. at the extrusion nozzle, while the distance between water and nozzle was about 5 cm.

The film was stretched longitudinally at a temperature of 150° C., with a stretch ratio of 7, obtained an oriented film 80 micron thick. This film was then fibrillated on a pinned roller having a pin density of 14 pins/cm, with a periodical 4- row arrangement, using a film feed rate of 60 mt per minute, and a peripheral speed of the fibrillating roller of 88 mt/min.

The fibrillated film thus obtained had a surface area of 9.6 m$^2$/g. its thickness in microns, determined by a kripton gas absorption measure. The film was extended by transversal or cross pulled to 8 times its original width.

The netlike structure thus obtained was cut up into 8 equal cut ends; these cut ends were then superimposed on each other and the assembly thus obtained was heat-stabilized by heating at 125° C.

The product thus obtained had a weight of 67 g/m$^2$, a length of the main fibrils of 0.35–0.45 mm, and a length of the secondary fibrils comprised between 0.15 and 0.18 mm.

Using a Portland cement, there were prepared composite sheets of plates by alternating layers of nets with layers of cement, in a water/cement ratio equal to 30/100, being careful to arrange the nets in such a way as to maintain the reinforcement direction constant in each layer.

There was thus obtained a sheet or plate sized 48×44 cm, 7 mm thick, using for the purpose a total of 8 nets for a total of 124 grams, thus reaching a precentage of polypropylene net, with respect to the cement, of 8.4% by volume.

After allowing the sheet or plate to rest for 24 hours, it was aged in water at room temperature for 28 days.

Thereupon, the sheets or plates were cut up in the reinforcement direction into test pieces or specimens on which were then carried out three-point flexural strength tests according to the UNI 3948 method.

The bending occures along the direction of the reticular reinforcement of the polypropylene net. The unitary resistance to bending stresses at break, measured as a mean of 3 specimens drawn at different points of the sheet or plate, amounted to 265 kg/sq.cm.

EXAMPLE 2

Example 1 was repeated, the film extruded being of polypropylene with a melt point index of 16, additioned with 9% of low density polyethylene.

After stretching (at stretch ratio=7), the 80μ thick film was made to pass with both surfaces over rollers of 80 mm diameter, having a peripheral speed of 90 mt/min., and lined with an abrasive cloth of type 0, with the abrasive particles sized between 100 and 150 microns.

Thereby were obtained, on the whole surface of the film, superficial incisions or cuts at a specific density of 150–200 incisions/sq.mm, having an average depth of about 10μ and a diameter φ of 20–30μ, with the formation of fibrils in a specific quantity of 50–100 fibrils/sq.mm, which protrude from the surface of the film and have widths and thicknesses of between 20 and 30 microns, and lengths of between 20 and 200 microns.

The film was then fibrillated on a pinned roller as in Example 1, and according to the same procedures, thereby obtaining a product with a surface area of 18.5 m$^2$/g. its thickness in microns.

Operating as in Example 1, there were prepared 8-layered nets having the same characteristics as those of Example 1, as far as the weight of the nets is concerned, and with the same arrangement of the 8 layers.

Thereupon there were prepared composite net/cement plates, 7 mm thick, similar in composition and preparation to those of Example 1, to obtain test pieces for the flexural resistance tests according to the procedures indicated in Example 1.

The unitary resistance to bending stress at break of the test pieces amounted to 290 kg/sq.cm.

EXAMPLE 3

Following the same procedures as in Example 1, a polypropylene film was extruded having a melt index of 16, and being additioned with 9% of polyethylene and 0.2% of azodicarbonamide (expanding or bulking product).

The extrusion temperatures were maintained at 180° C. on the extruding screw and at 160° C. on the nozzle, while the cooling water/nozzle distance amounted to 3 cm. The film, after stretching with a stretch ratio of 7, showed a thickness of about 80μ. The film was then abraded on both surfaces, according to the same procedures as those described in Example 2, and then fibrillated under the same conditions as in Example 1. The fibrillated film showed a surface area of 48 sq.mt/g. its thickness in microns.

Operating in a similar way as in Example 1, there were prepared, with the fibrillated film, 8-layered nets, arranged as in said example, the nets having a weight of 67 g/sq.mt, and with which, with the same procedures as those described in Example 1, there were prepared composite cement plates of the same composition.

The microscope examinations of the film before the stretching showed the presence of close bubbles and cavities, 10 to 20 microns wide and 20–400 microns long. After the stretching, the bubbles were found to be elongated by about 7 times while they were only a few microns wide. On the abraded and fibrilled film, the bubbles caused both by the action of the abrasive as well as by the fibrillating pins or needles, gave place to a finely subdivided structure with the appearance of cavities and very fine fibrils, extremely small and vary dispersed.

The resistance to flexural stresses of the composite plate speciment amounted to 340 kg/sq.cm.

EXAMPLE 4

The fibrillated film of Example 3 was treated with electrical high frequency discharges, with a power of 3,000 Watt. The measure of the surfactance degree of the film showed a value of 36 dine/cm, measured according to ASTM D 2578 method.

By using the same cement and following the same procedures as those of Example 1, there were prepared from such a film 8-layered nets, and with these latter there were formed composite cement plates.

Becuase of the improved wettability of the nets, there may be inserted into the cement a total volume of about 9.5% by volume of nets.

The flexural stress resistance tests indicated a breaking load of 360 kg/sq.cm.

What is claimed is:

1. Process for preparing fibrillated films or flat netlike structures of synthetic polymers and having a specific surface area of more than 12 $m^2/g.$, the thickness thereof in microns, said process consisting of the following operations:
    (a) preparing a film of at least one orientable synthetic polymer containing an expanding of bulking agent;
    (b) expanding the expanding or bulking agent contained in the film;
    (c) longitudinally or prevailingly longitudinally orienting the expanded film, by stretching with a longitudinal stretch ratio comprised between 3 and 15, with the formation of an oriented film 20 to 200$\mu$ thick; and
    (d) fissuring or slitting the oriented film.

2. The process of claim 1, in which the expansion (b) produces in the film bubbles or cavities with diameters not exceeding 50% of the thickness of the film.

3. Process for preparing fibrillated films or flat netlike structures of synthetic polymers and having a specific surface area of more than 12 $m^2/g.$, the thickness thereof in microns which process comprises the following operations:
    (a') longitudinally prevailingly longitudinally orienting a film made of at least one orientable synthetic polymer, by stretching with longitudinal stretch ratios of between 3 and 15, thereby obtaining an oriented film with from 20 to 200$\mu$ thickness;
    (b') superficially abrading the oriented film; and
    (c') fissuring or slitting the film thus oriented and abraded.

4. The process of claim 3, in which the oriented film (a') is an expanded film, with bubbles inside it having a diameter not exceeding 50% of the thickness of the film.

5. Plates and manufacured articles based on hydrosetting binders containing fibrillated films or flat, netlike structures obtained by the process of claim 1.

* * * * *